Patented Jan. 13, 1948

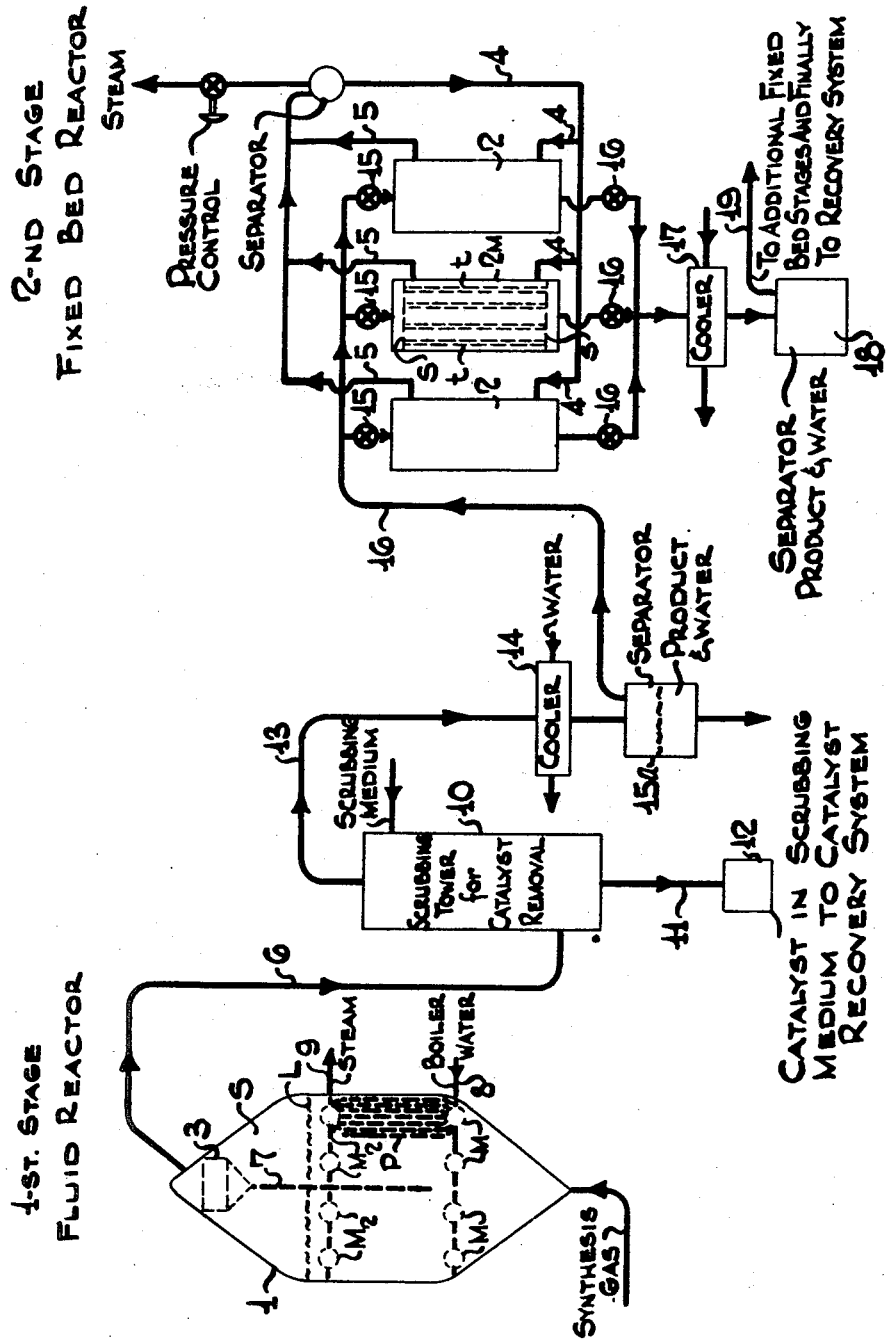

2,434,537

UNITED STATES PATENT OFFICE 2,434,537

TWO-STAGE SYNTHESIS OF HYDROCARBONS

Frank T. Barr, Summit, and Walter G. Scharmann, Westfield, N. J., assignors to Standard Oil Development Company, a corporation of Delaware

REISSUED

SEP 6 1949

Application December 16, 1944, Serial No. 568,514

13 Claims. (Cl. 260—449.6)

Our invention relates to the novel features hereinafter disclosed in the following specification and claims, reference being had to the accompanying drawing.

The synthesis of hydrocarbons, including oils, from carbon monoxide and hydrogen is a matter of record. Our improvements involve a two-stage process in which we employ a "fluid" catalyst reactor in the first stage and a fixed or stationary bed reactor in the second stage. Since the "fluid" catalyst type of operation is more flexible than the stationary bed type of process, we are enab'ed to secure the benefits of our invention which will be described presently. We so control the process that in the first stage of our process, only those hydrocarbons which are gaseous or exist as vapors under the conditions of operation are formed in the first stage of our process. The reason underlying this technique is that we desire to avoid wax or liquid formation on the powdered catalyst employed in the "fluid" stage of the process. As is known, wax is formed in the normal synthesis and this wax deposits on the catalyst requiring washing to remove the same. It is difficult to remove wax from a powdered catalyst. But more important perhaps, is the fact that it is difficult to carry out a fluid catalyst type of operation in the presence of a liquid and hence we operate the process so as to limit the operation to the formation of hydrocarbons which are vaporized at operating temperatures and then discharge the products of this first stage into a second, fixed bed stage where the conversion is continued.

It is one of the objects of this invention, therefore, to conduct the synthesis of hydrocarbons from CO and hydrogen in a process where advantage is taken in both the fixed or stationary bed type of operation and the "fluid" catalyst type of operation, i. e., in which the catalyst is suspended in the reaction gases.

Another object of our present invention is to provide means for effecting the synthesis of hydrocarbons, including norma'ly liquid hydrocarbons, by reacting together CO and hydrogen in the presence of a suitable catalyst so as to produce maximum quantities of desired hydrocarbons in an expeditious and relatively cheap manner.

A further object of our invention is to provide means for synthesizing normally liquid hydrocarbon oils by reacting CO and hydrogen in the presence of a catalyst under conditions affording rigid temperature control.

Other and further objects of the invention will appear from the following more detailed description and claims.

In the accompanying drawing, we have shown diagrammatically a combination of apparatus elements in which a preferred modification of our invention may be carried into practical effect.

Explaining at first, in a general way, the flow of reactants through the system illustrated in the accompanying drawing, we wish to point out the theory upon which our improvements are based. In the synthesis of hydrocarbons from carbon monoxide and hydrogen over stationary catalyst, the reaction in the inlet section tends to proceed at rates sufficiently high so that temperature control is difficult and expensive equipment is necessary to prevent temperature runaway from occurring. At the end of the reaction, however, the decrease of concentration of reactants together with higher thermal stabilizing effect of the inerts makes the fixed bed operation more amenable to ordinary means of temperature control. Fluid catalyst operation for hydrocarbon synthesis, on the other hand, provides a means of temperature control sufficient to prevent runaway operation at any reactant concentration, but formation of liquid sometimes tends to coat the catalytic particles and reduce their activity. Inasmuch as the fluid catalyst technique does not lend itself readily and economically to the removal of the liquid material from the catalyst, such formation is distinctly disadvantageous.

As indicated we have found that it is advantageous to combine the two types of operation. The fluid catalyst operation is used on the fresh synthesis gas under conditions such that only a portion of the synthesis gas is converted to hydrocarbons higher than methane. Conversion is limited so that materials liquid under the conditions of operation are not formed. The tail gas from this stage is led to fixed catalyst synthesis reactors. The concentration of reactants is now sufficiently low that satisfactory temperature control in fixed bed operation is obtained as described above and liquid products such as may be formed drain from the catalyst without impeding the progress of the reaction. The tail gas from the second stage is led to a coolercondenser and naphtha recovery plant. Tail gas from the fluid catalyst section may be cooled if desired but operation taking the gas directly from the separating system is simpler and ordinarily superior.

In the drawing similar reference characters refer to similar parts.

Referring in detail to the drawing, 1 represents a fluid catalyst reactor and 2 and 2M represent three reactors of which 2M indicates the internal structure and shows the reactor to contain tubes $t$ terminating in tube sheets S, the catalyst being disposed in the tubes and provision being made for circulating a cooling medium from pipes 4 through the several reactors in parallel and withdrawing the cooling medium through pipes 5. In the drawing the cooling medium is indicated as water, but obviously any cooling medium may be used such as molten salts, mercury, etc.

The drawing has been provided with sufficient legends and arrows to enable ease in reading and mere inspection is nearly sufficient to understand the operation thereof.

The synthesis gas enters the system proportioned in the ratio of about 2 mols of $H_2$ per mol of CO, and then is discharged into the bottom of "fluid" reactor 1 where it passes upwardly in contact with powdered cobalt catalyst containing thoria or magnesia and supported on carriers such as silica gel or kieselguhr. This catalyst is known to the art. Other catalysts known to the art, such as iron promoted by alkali, may also be used. Proportion of $H_2$ to CO in the synthesis gas may not be the same as required for cobalt catalysts, and is preferably adjusted to the optimum, which for iron catalysts is about 1:1. The catalyst size averages 200 mesh, although it may vary from 100 to 400 mesh. As a matter of fact, a substantial portion say 20% of the catalyst may have a size of less than 20 microns. Depending on the size of the particles of catalyst, the velocity of the gases in reactor 1 is controlled within the limits of 0.25 to 5 feet per second preferably from ½ to 3 feet per second. There results a "fluid" mass, i. e., a dense suspension of catalyst in gas. Also depending on the weight or amount of catalyst in the reactor, there will be an upper dense phase level at L and above L, a disengaging space S where the concentration of catalyst drops sharply so that when the gas enters the solid-gas separating device(s) 3 (which may be one or more "cyclone" separators) the concentration of catalyst is low (ranging from 0.075 to 0.003 lb. per cubic foot). As indicated the gas passes through the separator(s) 3 wherein additional catalyst is removed and finally exits via line 6. Separated catalyst is returned from the separator(s) 3 via dip pipe 7.

Since the reaction between CO and $H_2$ is exothermic, it is advisable to abstract heat from the reactor and this may be done by circulating a fluid such as water in heat exchange relationship with the reactants within the reactor 1. In other words, external water enters the manifolds M from feed pipe 8, passes upwardly through tubes P wherein steam is generated and exits via manifolds $M_2$ and pipe 9. Very accurate and rigid temperature control may be achieved by the method indicated due to the turbulent state of the fluidized catalyst constantly moving like the particles of a gas, thus insuring complete mixing and uniformity of temperature so that no two points in the catalyst mass, no matter how far removed, vary in temperature more than a few degrees.

The tail gas in line 6 from reactor 1 passes into a scrubber 10 wherein it is washed with a liquid say a portion of the naphtha formed in the process. This washing serves to remove substantially the last traces of entrained catalyst which catalyst is withdrawn as slurry via line 11 and passes to a catalyst recovery system 12 where the catalyst may be recovered as by filtering, etc., in apparatus not shown.

The scrubbed vapors leave scrubber 10 via line 13, then are forced through a cooler 14, thence pass into a separator 15a and thence pass to the stationary catalyst via line 16. In separator 15a, water and hydrocarbons (boiling below about 400° F.) collect at the bottom of the separator and may be recovered therefrom.

As indicated, the gaseous material in line 14 may be forced into any one of three reactors 2 by manipulation of the valves 15, thence pass through the tubes $t$ containing catalyst and is withdrawn from the bottom by operation of valves 16. The product is cooled in 17 and collected in 18.

If desired, unconverted material may be withdrawn through line 19 from separator 18 and passed through one or more additional stationary bed converters (not shown).

As to conditions the following give good results:

*First, in reactor 1*

| | Broad Range | Preferred Range | |
| --- | --- | --- | --- |
| | | Cobalt Catalysts | Iron Catalysts |
| Pressure in lbs. per sq. in. | atmos.-350 | 15-125 | 40-250 |
| Temperature in degrees F. | 350-700 | 400-500 | 500-650 |
| Throughput (cubic feet CO at 60° F. and 1 atmos. per lb. of catalyst per hour) | 0.5-25 | 1-15 | 1-15 |
| Conversion of CO per cent | 25-75 | 35-60 | 35-60 |
| Catalyst | | In powder form | |

*Second, in reactor 2*

| | Broad Range | Preferred Range | |
| --- | --- | --- | --- |
| | | Cobalt Catalysts | Iron Catalsyts |
| Pressure in lbs. per sq. in. | atmos.-350 | 15-125 | 40-250 |
| Temperature in degrees F. | 350-700 | 375-450 | 500-650 |
| Throughput (volumes of gas at 60° F. 1 atmos. per volume of catalyst per hour) | 100-1000 | 100-400 | 100-400 |
| Conversion of CO (overall on original gas) per cent | 70-100 | 80-100 | 80-100 |
| Catalyst | | In the form of pills, pellets, granules, etc. | |

It is not necessary that the same composition of catalyst be used in the above two stages.

Whereas conditions of operation avoiding deposition of liquid on the catalyst in the first stage will limit production from this stage to primarily gasoline and light oils, the product of the second stage may contain heavy oils and wax as well.

As heretofore indicated, our invention makes use of both the fixed bed type of operation and the fluid catalyst type of operation, cooperating in conjunction with each other. We have found that the combination of the two methods of operating is advantageous for the reasons set forth below:

In fixed catalyst operation for the synthesis of hydrocarbons from carbon monoxide and hydrogen, it has been found that reaction rates near the entrance of the synthesis gas to the catalyst are very high. It is necessary to adjust conditions such that the rate of reaction at this point is sufficiently low that temperature control can be maintained. As the reaction progresses, however, the concentration of CO and hydrogen in the synthesis gas decreases and the concentration of inert materials builds up. As a result, reaction rates are slower for given conditions and the exigencies of temperature control are not so great. Since it is ordinarily necessary to adjust conditions to those required at the point of maximum reaction rate, operation of the remaining catalyst volume is sometimes at conditions far removed from optimum efficiency. We avoid this difficulty by using the field catalyst technique for operation on fresh synthesis gas, whence the critical initial conditions are better controlled, and the fixed catalyst reactors operate at conditions nearing optimum efficiency for all parts of the bed.

In the use of the fluid catalyst technique for synthesis of hydrocarbons from carbon monoxide and hydrogen another desirable process involves the passage of the synthesis gas with catalyst suspended therein through tubes whose walls act as heat transfer surface for removal of the heat of reaction. Optimum operating conditions are such that tubes of 3-4" inside diameter are used and the total passage length is of the order of 400-1000 ft. Variation of capacity of the reactor is achieved by putting two or more of these elements in parallel. The relations indicated are based on obtaining optimum heat transfer rate together with the desired time of contact for the reaction.

Here, however, the same difficulty arises as when the synthesis is carried out using fixed catalyst as described above. Although various methods for obtaining control suited specifically to the reaction going on in that part of the equipment under consideration have been proposed, we have found that a particularly advantageous method of obtaining said control involves the charging to the fresh synthesis gas of relatively small quantities of fluid catalyst, such as will promote the reaction only to a limited degree. Because of the high reactant concentration at this point, reaction rate can be maintained at a reasonable level with a smaller proportion of catalyst than at subsequent points in the reaction path. At the point where reaction with the amount of catalyst originally supplied has decreased to an undesirably low level, additional catalyst is supplied. The increased quantity of catalyst brings the reaction rate to the desired level. The charging of additional catalyst may be repeated a number of times as desired and conditions may be set so as to achieve high conversion of the reacting materials.

Construction of equipment having such relatively long passage length would normally entail the assembly in series of a number of units of shorter passage length. Thus, a passage length of 560 ft. is in one case achieved by putting in series 28 units, each having tubes 20 ft. in length. Transfer of the reacting materials, from one unit to another in this arrangement is disadvantageous, however, owing to the necessity for making the transfer time as short as possible, because of the absence of adequate cooling surface. Although satisfactorily short transfer time can be provided, velocities through the transfer lines are great and pressure drops are thereby large.

We have found that for fluid catalyst operation the employment of a large number of passes within one shell is more satisfactory and is feasible from a mechanical point of view. Whereas in fixed catalyst operation the use of several passes in one shell involves the necessity for providing means for removal of the return bends for charging and discharging catalyst, such arrangement is not required with fluid catalyst. It is therefore possible to assemble with welded or otherwise permanently secured return bends a large number of relatively short lengths of tubing in a single shell so as to obtain the desired length of travel. For example, the 560 ft. of travel referred to above may be achieved by inserting in one shell 28 lengths of 20 ft. tubing connected in series by return bends. The return bends as well as the tubes may be surrounded by the cooling medium which in turn is contained in the shell and is outside the tubes. Fixed connection with lines outside the shell is necessary only at the entrance and exit of the 28-tube element. Mechanical allowance to take care of differential thermal expansion difficulties is not required. In case it is desired to assemble a number of the multiple pass units in parallel in a single shell, inlet and outlet headers within the shell may be provided. It is again necessary to provide secure connection to the shell for only one inlet and one outlet pipe. This arrangement has the further advantage of making assembly and dismantling of the equipment simple, inasmuch as the entire tube bundle can be removed from the shell by breaking piping connections at only two points.

It is apparent that any combination of the series and parallel arrangement within one shell may be made. Under certain conditions achievement of the 560 ft. passage may be obtained, for instance, by connecting 7 lengths of 20 ft. tubing in series in a single shell and putting 4 such shells in series. The number of 20 ft. passes in each shell need not be the same but may be varied as desired, providing only that the required total passage length be obtained.

It is pointed out that more than one fluid or fixed bed may be employed in the combination of fluid and stationary catalyst operation disclosed herein, and temperature control provided for each bed. For the fixed bed operation, a suitable arrangement involves the assembling in a vertical tower of a plurality of thin beds of catalysts, the catalyst in all cases being disposed suitably close to a heat removal surface, for instance, in small tubes or annular elements, and suitable separators being inserted in the shell on the cooling medium side to make possible independent control of the cooling medium temperature at each level. Catalyst tubes may extend through several cooling sections if desired and would be limited only by the length of tube available. An alternate arrangement involves the use of short tubes, the length of each cooling section, but with succeeding sections superimposed so closely that a minimum of free space between catalyst sections is allowed. This arrangement has the advantage that sections are transferable and individually removed for maintenance. A crane may be provided for assembling and dismantling sections stacked as many on one another as is desired.

It will be understood that periodically it may be necessary to remove wax from the stationary beds of catalyst, for the said wax deposits on the catalyst and diminishes its activity. The catalyst may be washed with a hydrocarbon oil, during a shut down period to effect this result. The details of washing the catalyst to de-wax the same are known to the prior art.

Numerous modifications of our invention will appear to those familiar with this art without departing from the spirit thereof.

What we claim is:

1. In the process of synthesizing hydrocarbons, including hydrocarbon oils, by contacting CO and hydrogen properly stoichiometrically proportioned at elevated temperatures and pressures with a catalyst, the improvement which comprises effecting rigid temperature control by first suspending catalyst in the synthesis gases to form a dense suspension and limiting the time of contact so that hydrocarbons which are liquid at operating conditions are formed in substantial amounts but not more than about 60% of the amount possible under the reaction conditions, withdrawing the material from the reaction zone and discharging it into a zone containing at least one stationary bed of catalyst, permitting the reactants to remain in contact with the reaction conditions for a sufficient period of time to cause the reaction to proceed until further substantial quantities of normally liquid product are formed, and recovering said normally liquid product from the second reaction zone.

2. The method of synthesizing hydrocarbon oils which comprises forcing a mixture of CO and $H_2$ into a first reaction zone containing a body of powdered catalyst in the form of a dense suspension, limiting contact time and temperature in said first reaction zone to induce substantial formation of hydrocarbons which are liquid at operating temperatures but not more than about 60% of the amount possible under the reaction conditions, withdrawing the gaseous reaction products from said first reaction zone and discharging them into a zone containing at least one bed of stationary catalyst, permitting the reaction to proceed in said second reaction zone at synthesis temperatures to maximum production of normally liquid products and recovering from the last-named zone, a product containing gasoline and gas oil.

3. The method of claim 1 in which the temperature in the first stage is from about 350° to 500° F. and the pressure is from about 10 to 250 lbs. per sq. in. gauge.

4. The method of claim 2 in which the temperature in the first stage is from about 350° to 500° F. and the pressure from about 10 to 250 lbs. per sq. in. gauge.

5. The method of claim 1 in which the temperature in the first stage is from about 375° to 450° F. and the pressure from about 25 to 100 lbs. per sq. in. gauge.

6. The method of claim 2 in which the temperature in the first stage is from about 375° to 450° F. and the pressure from about 25 to 100 lbs. per sq. in. gauge.

7. The process specified in claim 1 in which the feed rate in the first stage is from about 1 to 15 cubic feet of CO per hour per lb. of catalyst.

8. The method specified in claim 2 in which the feed rate in the first stage is from about 1 to 15 cubic feet of CO per hour per lb. of catalyst.

9. The method of claim 1 in which the feed rate to the second stage is from 100 to 1000 volumes of gas per volume of catalyst per hour.

10. A method for synthesizing hydrocarbons which comprises forcing CO and $H_2$ through a fluid mass of powdered cobalt containing catalyst in a first reaction zone at temperatures within the range of from about 350° to 500° F. at feed rates of 1 to 15 cubic feet of CO per hour per lb. of catalyst whereby the formation of hydrocarbon liquid at operating conditions is suppressed, withdrawing the reactants and forcing them through at least one body of pilled catalyst in the form of a fixed bed in a second reaction zone at temperatures within the range of from about 350° to 500° F. at feed rates of from about 100 to 1000 volumes of gas per volume of catalyst per hour, causing a heat absorbing fluid to circulate in heat exchanging in relationship with the reactants in both zones and recovering hydrocarbons including gasoline and gas oil from said second zone.

11. The method of claim 10 including the step of cooling reactants during their passage from the first to the second zone.

12. The method of claim 10 in which the feed to the first zone contains 2 mols of $H_2$ per mol of CO.

13. The method of claim 10 in which the catalyst in both zones is cobalt activated with thoria and supported in kieselguhr.

FRANK T. BARR.
WALTER G. SCHARMANN.

REFERENCES CITED

The following references are of record in the file of this patent:

UNITED STATES PATENTS

| Number | Name | Date |
|---|---|---|
| 2,286,447 | Thomas | June 16, 1942 |
| 2,178,824 | Atwell | Nov. 7, 1939 |
| 2,347,682 | Gunness | May 2, 1944 |
| 2,244,196 | Herbert | June 3, 1941 |

OTHER REFERENCES

Myddleton, "Journal Soc. Chem. Industry," 1936, vol. 55, pp. 121T–124T. (Copy in Div. 6.) 260/449.6.

Underwood, "Ind. and Eng. Chem.," 1940, vol. 32, pp. 449–453. (Copy in Pat. Off. Lib.) 260/449.6.

Ellis, "Chemistry of Petroleum Derivatives," vol. II, 1937, pp. 1233, 1234. (Copy in Division 6.)